United States Patent [19]

Favin

[11] 3,728,629

[45] Apr. 17, 1973

[54] AUTOMATIC TIME INTERVAL RANGING CIRCUIT FOR DELAY INTERVAL MEASUREMENTS

[75] Inventor: David Leonard Favin, Little Silver, N.J.

[73] Assignee: Bell Telephone Laboratories, Incorporated, Murray Hill, Berkeley Heights, N.J.

[22] Filed: Nov. 10, 1971

[21] Appl. No.: 197,411

[52] U.S. Cl. ....................................................324/186

[51] Int. Cl. ............................G04f 9/00, G04f 11/06

[58] Field of Search ......................................324/186

[56] References Cited

UNITED STATES PATENTS 3,432,687 3/1969 Emmer ............................324/186 X

*Primary Examiner*—Alfred E. Smith

*Attorney*—R. J. Guenther et al.

[57] ABSTRACT

Delay time intervals are measured by employing a flip-flop circuit which is SET by a reference pulsating signal and RESET by a test signal. A desired measurement precision is obtained by causing the flip-flop to be SET and RESET within the interval between adjacent pulses developed by a reference clock. This is achieved automatically by selectively shifting the phase of the reference pulsating signal waveform to delay SETTING of the flip-flop. The incremental shift in the reference signal waveform is directly related to the number of reference pulses occurring during the initial interval in which the flip-flip is SET and RESET.

12 Claims, 4 Drawing Figures

AUTOMATIC TIME INTERVAL RANGING CIRCUIT FOR DELAY INTERVAL MEASUREMENTS

BACKGROUND OF THE INVENTION

This invention relates to measurement systems and, more particularly, to time-interval measurement systems.

In order to maintain communication systems, for example, telephone trunks and the like, numerous measurements are made of system characteristics. Important among these is the measurement of envelope delay in telephone trunk systems. Envelope delay is determined by propagating a test signal through a system under test, for example, a telephone trunk, and then measuring the time interval between the occurrence of a predetermined phase position of the test signal and a reference pulse signal.

One such envelope delay measurement system is described in U.S. Pat. No. 3,271,666, issued to T. C. Anderson and D. L. Favin on Sept. 6, 1966. In that system, the time interval between the occurrence of the test signal and a reference pulse signal is measured by employing a bistable switching element. The bistable element responds to the test and reference signals to switch from a first stable state to a second stable state and then back to the first stable state. A more precise time interval measurement is obtained in such a system by adjusting the system so that the bistable element indicates a measure only of intervals equal to or less than the interval between adjacent reference pulses. This is achieved in the;prior system by employing a gate circuit which is controlled selectively to inhibit reference pulses from being supplied to the bistable element. A signal for controlling the gate circuit is generated by a monostable multivibrator having an adjustable unstable interval to provide known time interval ranges. In turn, the monostable multivibrator is triggered by a pulsating signal having a period equal to the test signal period. This period is also an integral multiple of the interval between adjacent reference pulses. Operation of this prior measurement system involves a manual adjustment of the unstable interval of the monostable multivibrator to vary the instant when a reference pulse is supplied to the bistable element to effect the desired switching. The output of the bistable element is then displayed on a meter where the envelope delay interval is indicated by the meter reading and the range is indicated by the manual adjustment of the monostable multivibrator.

Although the prior system yields a satisfactory measurement of envelope delay, it necessarily relies upon human intervention in adjusting the system to a proper measurement range. The required use of a human operator in making delay measurements is undesirable. Indeed, in order to meet the demands of maintaining modern telephone systems most, if not all, test procedures must be fully automated and, hence, reliance on human intervention must be minimized.

Accordingly, it is a general object of this invention to adjust automatically the range in time interval measurements.

SUMMARY OF THE INVENTION

This and other objects are accomplished, in accordance with the inventive principles described herein, in a time interval measurement system by selectively controlling the phase of a reference pulsating signal relative to a test signal to effect automatic time interval ranging. This is achieved by selectively altering the pulse duration of the reference signal.

More particularly, a time interval measurement system, in accordance with the invention, includes a source of clock pulses which are supplied to a divider circuit for generating a reference pulsating signal. The reference pulsating signal normally has a period which is an integral multiple of the interval between adjacent clock pulses. The reference pulsating signal is supplied to a bistable switching element, which is responsive to a predetermined change of state of the reference signal to switch from a first stable state to a second stable state. A signal representative of a predetermined phase position of a received test signal is also supplied to the bistable element and causes the bistable element to switch from the second stable state back to the first stable state. Automatic time interval ranging is effected, in accordance with the invention, by inhibiting a number of clock pulses from being supplied to the divider circuit equal to the number of clock pulses occurring during the interval that the bistable element is in the second stable state. Consequently, the phase of the reference pulsating signal is altered by causing one cycle to be lengthened. In turn, this lengthening of the reference signal causes a delay in switching of the bistable element from the first stable state to the second stable state.

By virtue of the functioning of this circuit, the bistable element is caused to switch from a first stable state to a second stable state and back to the first stable state within the interval between adjacent clock pulses. Operation of the invention in effecting this objective is commonly referred to as "automatic ranging". Once automatic ranging has occurred, the desired precise time interval measurement is obtained by counting the number of clock pulses which have been inhibited and combining the related time interval represented by those clock pulses with the interval the bistable element is in its second stable state.

BRIEF DESCRIPTION OF THE DRAWING

These and other objects and advantages of the invention will be more fully understood from the following detailed description of the invention taken in accordance with the appended drawings in which.

DETAILED DESCRIPTION

Figures 1, 4:
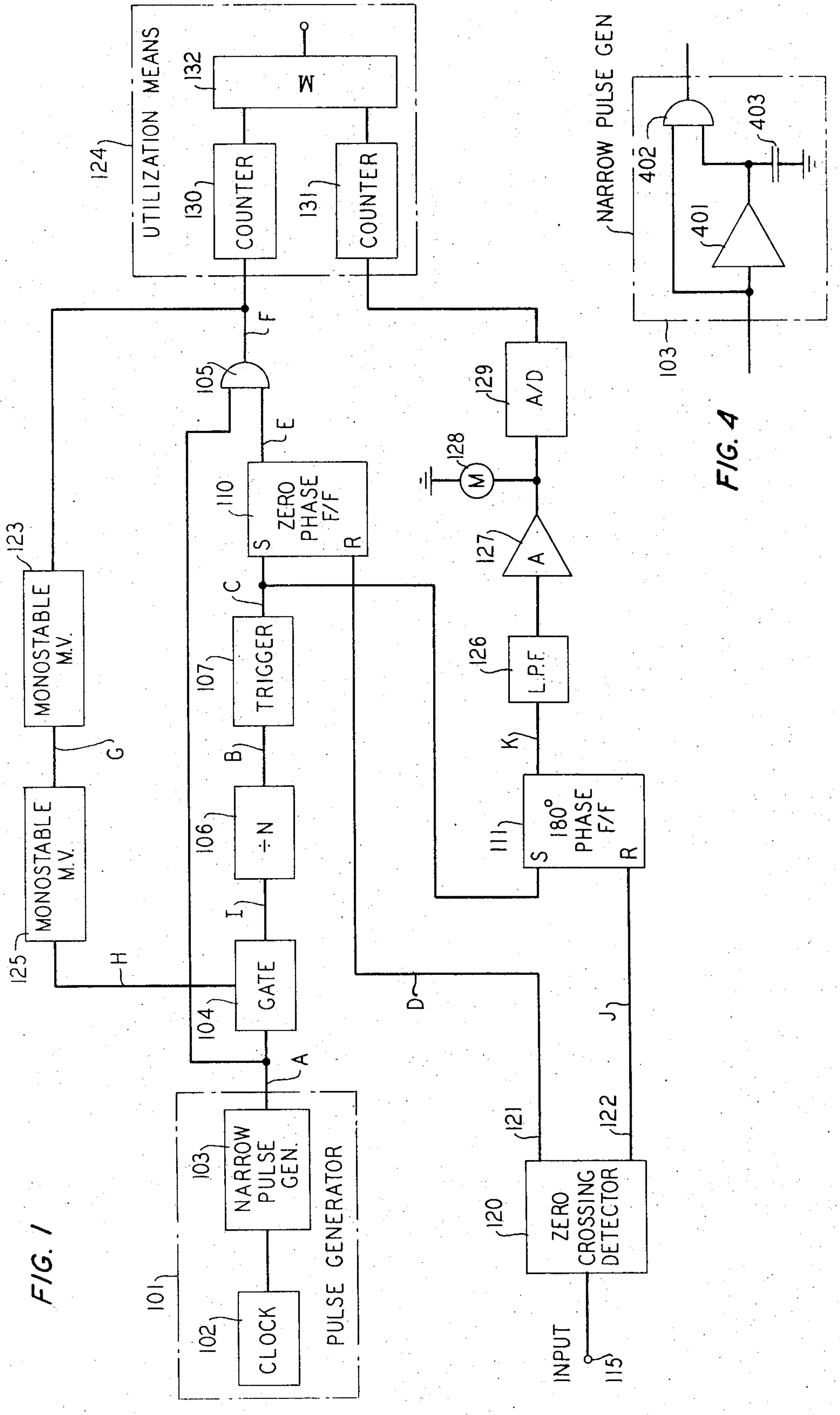
FIG. 1 shows a simplified block diagram of a delay time interval measurement circuit illustrating the invention.
FIG. 4 depicts details of the narrow pulse generator of FIG. 1.
Figure 2:
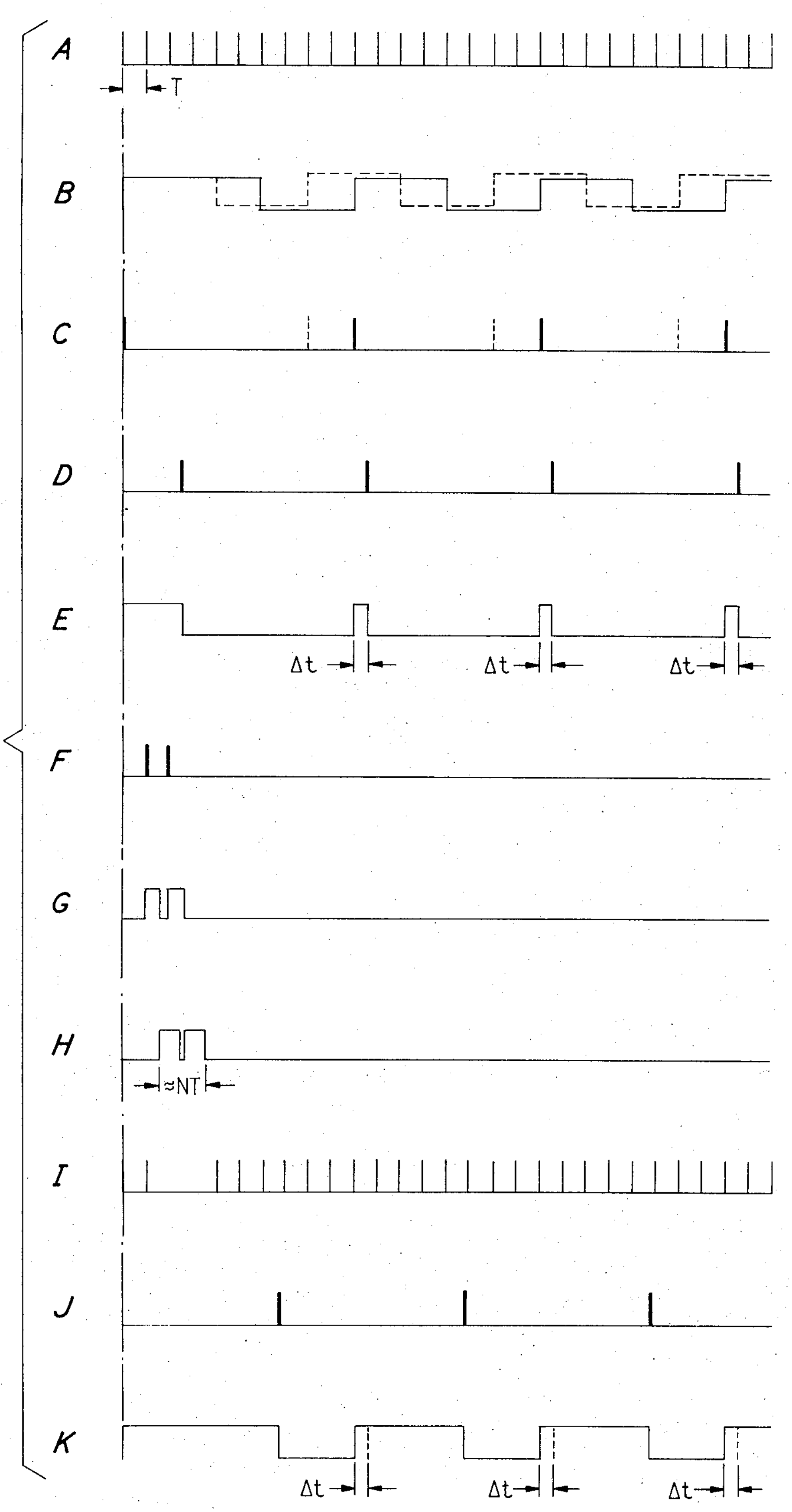
FIG. 2 depicts a series of waveforms useful in describing the circuit shown in FIG. 1.
Figure 3:
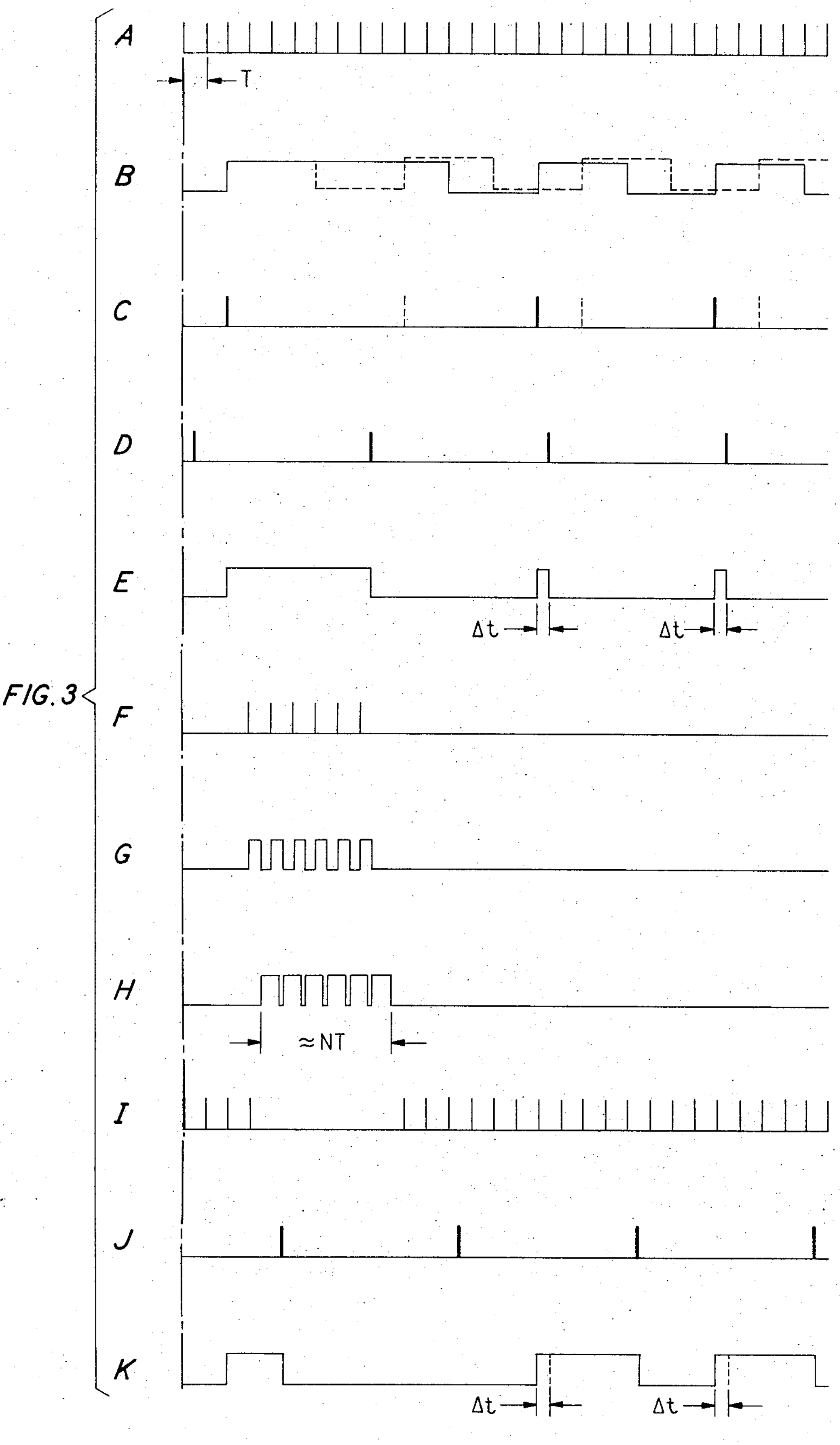
FIG. 3 shows another series of waveforms also useful in describing the circuit shown in FIG. 1.

FIG. 1 depicts in simplified block diagram form a delay time interval measurement circuit in accordance with the invention. FIGS. 2 and 3 show waveforms of signals developed in the circuit shown in FIG. 1. The waveforms shown in FIG. 2 illustrate operation of the invention in measuring a test signal which is "lagging" a reference signal. The waveforms shown in FIG. 3 illustrate operation of the invention in measuring a test signal which is "leading" the reference signal. The waveforms shown in both FIGS. 2 and 3 are labeled to correspond to the circuit points indicated in FIG. 1.

Referring to FIG. 1, pulse generator 101 generates pulse signals at a stable predetermined interval chosen to achieve a desired precision in measuring delay time intervals. Waveform A of FIG. 2 illustrates a series of clock pulse signals developed at the output of pulse generator 101. In order to achieve a "high" precision in measuring time intervals, the width of each pulse developed at the output of generator 101 must be minimized. However, the pulse width must not be so narrow as to become incompatible with other circuit components utilized in practicing the invention. For example, circuit components such as flip-flops and the like may not respond to a pulse having an extremely narrow width. A narrow pulse signal having an acceptable width is generated by supplying a signal from clock 102 to narrow pulse generator 103. The frequency of the clock signal is selected to obtain a desired interval between pulses. Details of narrow pulse generator 103 are shown in FIG. 4.

Referring briefly to FIG. 4, there is shown details of narrow pulse generator 103. Operation of pulse generator 103 is straightforward and relies primarily upon the inherent signal delay of logic circuits. For example, a symmetrical pulsating signal (not shown) generated by clock 102 (FIG. 1) is supplied to the input of inverter 401 and to one input of AND gate 402. As is well known in the art, the output of inverter 401 is normally high and AND gate 402 responds to high state signals simultaneously applied to both of its inputs to generate a high state signal at its output. Thus, at the instant the clock signal applied to inverter 401 and one input of AND gate 402 goes "high" the output of AND gate 402 also goes high. Inverter 401 responds to the change of state of the clock pulse to switch to a "low" state after the termination of an interval equal to the internal delay of inverter 401. Typically, this delay is approximately 10 nanoseconds. In turn, AND gate 402 responds to the change of state of the signal developed at the output of inverter 401 to switch to a low state. Consequently, the pulse signal developed at the output of AND gate 402 has a width approximately equal to the internal delay interval of inverter 401. The internal delay of AND gate 402 merely shifts the position of its output pulse and does not contribute to the output pulse width. The width of the pulse generated by narrow pulse generator 103 may be increased as desired by utilizing capacitor 403. Typically, a pulse having a duration of 30 nanoseconds is desirable. Accordingly, the component value of capacitor 403 is selected to effect an additional 20 nanosecond delay.

Returning to FIG. 1, the output of pulse generator 101, as shown in waveform A of FIG. 2, is supplied to controllable gate 104 and to one input of AND gate 105. Gate 104 may be anyone of numerous controllable switching devices known in the art. Preferably, gate 104 is a logic gate having an inhibit input. Gate 104 is normally activated to supply the pulse signal output of generator 101 to divider 106.

Divider 106 is operative to generate a pulsating signal having a period which is an integral multiple of the interval between pulses supplied from generator 101. In this example, not to be construed as limiting the scope of the invention, divider 106 responds to the clock pulses, shown in waveform A of FIG. 2 to perform a 4:1 division and normally yields a signal as shown in dashed outline in waveform B of FIG. 2. The signal shown in solid outline in waveform B of FIG. 2 illustrates the output of divider 106 when automatic ranging has occurred, in accordance with the invention, and will be described below.

The signal developed at the output of divider 106 is supplied to trigger circuit 107. Trigger circuit 107 responds to the positive going transition of the output signal from divider 106 to generate a pulse signal as shown in waveform C of FIG. 2. Again, the signals in dashed outline in waveform C of FIG. 2 illustrate signals which would have been generated if automatic ranging had not occurred. The signals shown in solid outline in waveform C of FIG. 2 illustrate operation of trigger 107 when automatic ranging has occurred. The pulse signal generated by trigger 107 is supplied to the SET inputs of zero phase flip-flop 110 and 180° phase flip-flop 111. Flip-flops 110 and 111 both respond to the output of trigger 107 to switch from a low state to a high state and generate signals at their respective outputs as shown in waveforms E and K of FIG. 2, respectively.

A received test signal to be measured is supplied via input terminal 115 to zero crossing detector 120. Detector 120 is responsive to the supplied test signal to generate a pulse signal at point 121 representative of the positions of the positive going zero crossings of the test signal as shown in waveform D of FIG. 2. Detector 120 also generates a pulse signal at point 122, representative of the positions of the negative going zero crossings of the test signal as shown in waveform J of FIG. 2. That is to say, detector 120 generates signals representative of the zero phase position and the 180° phase position of a received test signal.

The pulse signal representative of the zero phase position of the test signal, as shown in waveform D of FIG. 2, is supplied to the RESET input of zero phase flip-flop 110. This causes flip-flop 110 to switch from a high state to a low state, again as shown in waveform E of FIG. 2. The pulse width of the output signal generated by flip-flop 110 is adjusted, in accordance with the invention, to be within the interval between adjacent ones of the pulses generated by pulse generator 101. As stated above, operation of the invention to effect this objective is called "automatic ranging".

The output of flip-flop 110 is supplied to a second input of AND gate 105. Operation of AND gate 105 is straightforward. Gate 105 allows clock pulses to pass only when the output of flip-flop 110 is in a high state. These clock pulses, as shown in waveform F of FIG. 2, are supplied to monostable multivibrator 123 and to utilization means 124.

In utilization means 124, the pulses passed by AND gate 105 are supplied to counter 130 where they are stored until needed. Since a 4:1 division is employed in the instant example, counter 130 need only have a capability of counting seven pulses. This represents the maximum number of pulses which may be "gated-out" in an automatic ranging cycle. Operation of counter 130 is described in greater detail below.

Monostable multivibrator 123 is responsive to the clock pulses appearing at the output of AND gate 105 to generate a pulsating signal having a predetermined interval. In this example, the interval of the pulse signals generated by monostable multivibrator 123 is equal to one-half the clock pulse interval, as shown in waveform G of FIG. 2. Monostable multivibrator 125 is responsive to the negative going transition of the output signal generated by monostable multivibrator 123, to generate a pulse signal having an interval substantially equal to but less than the clock pulse interval, as shown in waveform H of FIG. 2. The total duration of the output signal generated by monostable 125 is approximately NT, where N is the number of pulses appearing at the output of AND gate 105 and T is the interval between adjacent clock pulses. However, the interval of the individual control signals generated by monostable multivibrators 123 and 125 need not be any specific duration so long as the output signals generated by monostable 125 encompass the appropriate number of clock pulses.

Monostable multivibrators 123 and 125 in conjunction with AND gate 105, generate a signal for controlling gate 104 selectively to inhibit a number of clock pulses from being supplied to divider 106 equal to the number of clock pulses appearing at the output of AND gate 105. Said another way, gate 104 operates in response to the output of monostable multivibrator 125 to "gate out" a number of clock pulses from being supplied to divider 106 equal to the number of pulses passed by AND gate 105, as shown in waveform I of FIG. 2. This, in accordance with the invention, effects automatic time interval ranging by causing the output signal of divider 106 to "shift" by an interval directly related to the number of clock pulses appearing at the output of AND gate 105. In turn, this causes the output of flip-flop 110 to be switched from a low state to a high state and back to a low state within one clock pulse interval, thereby effecting the desired precision in measurement of the time delay interval.

Once automatic ranging has occurred, the output signal, $\Delta t$, generated by flip-flop 110 is in a steady state condition and may, if desired, be amplified, filtered and supplied to a meter to be read and/or to utilization means 124.

Since the duration that flip-flop 110 is in the second stable state represents a small portion of the signal period, direct measurement is undesirable. As described in U.S. Pat. No. 3,271,666, cited above, it is advantageous to employ a second flip-flop circuit which operates at a 50 percent duty-cycle in order to minimize measurement errors. Flip-flop 111 is employed for this purpose. Accordingly, flip-flop 111 is SET via the output of trigger 107 to a high state and RESET via the 180° phase output from zero crossing detector 120. The signal developed at the output of flip-flop 111 also represents the residual delay interval $\Delta t$ and is shown in waveform K of FIG. 2. The output signal from flip-flop 111 is supplied via low pass filter 126 and amplifier 127 to meter 128 and/or to analog-to-digital converter 129. Residual delay interval $\Delta t$ being measured is visually displayed on meter 128. The output of analog-to-digital converter 129 is supplied to utilization means 124 where it is stored in counter 131.

Signals representative of residual time interval, $\Delta t$ stored in counter 131 and of coarse time interval NT stored in counter 130 are supplied to summing network 132. A signal representing the total time interval being measured is developed at the output of summing network 132 and may be used as desired. For example, data representing the measured time interval may be stored for future use or transmitted to a remote station for analysis.

FIG. 3 shows a set of waveforms illustrating signals generated in the embodiment of the invention as illustrated in FIG. 1 when a received test signal is "leading" the reference signal, i.e., the zero phase RESET trigger is leading the SET trigger as shown in waveforms D and C of FIG. 3, respectively. Operation of the invention in effecting automatic time internal ranging when the received test signal is leading the reference signal is essentially identical to that described above for a lagging test signal, and therefore, will not again be discussed in detail.

For a leading test signal the delay interval being measured is simply longer. Consequently, as shown in the B waveform of FIG. 3, the period of the signal generated by divider 106 is lengthened by an interval greater than the "normal" period of the output signal generated by divider 106. This causes the SET trigger, as shown in waveform C of FIG. 3, to "shift" by an interval corresponding to the change in divider 106 output. As seen from waveforms J and K of FIG. 3, a RESET pulse is "skipped" in this example because of the shift in the position of the SET pulse. Flip-flop 111 (FIG. 1) is thereafter SET and RESET in the proper order to achieve the desired measurement of delay interval $\Delta t$ as indicated in waveform K of FIG. 3. Other similarities between the waveforms of FIG. 2 and FIG. 3 are readily ascertainable by comparing the respective figures.

In order to distinguish between lagging and leading test signals, counter 130 (FIG. 1) is preset to a desired modulo. From prior experience, the maximum lag and lead intervals are usually known. In the instant example, the maximum possible lag and lead intervals are assumed to be equal. Accordingly, counter 130 is preset to a count of four to yield an output as follows:

| Counter **130** | | Test Signal | |
|---|---|---|---|
| Input | Output | Lagging | Leading |
| 1 | 4 | 0 | |
| 1 | 5 | 1 | |
| 2 | 6 | 2 | |
| 3 | 0 | 3 | |
| 4 | 1 | | 3 |
| 5 | 2 | | 2 |
| 6 | 3 | | 1 |
| 7 | 4 | | 0 |

Thus, in measuring a lagging test signal, as described above, counter 130 (FIG. 1) is advanced by two clock pulses supplied via AND gate 105 (waveform F, FIG. 2) from an initial count of four to a count of six. This count indicates that the test signal is lagging the reference signal by an interval of 2T plus $\Delta t$. Where T is the interval between adjacent clock pulses and $\Delta t$ is the residual time interval stored in counter 131. Similarly, in measuring a leading test signal, also as described above, counter 130 is advanced by six clock pulses supplied via AND gate 105 (waveform F, FIG. 3) from an initial count of four to a count of three. This count indicates that the test signal is leading the reference signal by an interval of 1T plus $\Delta t$. Accordingly, an indication of whether the test signal is lagging or leading the reference signal is readily attained.

What is claimed is:

1. In a time interval measurement system, apparatus for automatic time interval ranging which comprises:
  means for generating reference pulses at predetermined intervals;
  means responsive to said reference pulses for generating a first pulsating signal;
  means responsive to a test signal for generating a second pulse signal representative of a first phase position of said test signal;
  means responsive to said first pulsating signal and said second pulse signal for generating a control pulse signal, said control signal having a pulse width equal to the interval between the occurrence of a prescribed change of state of said first pulsating signal and said second pulse signal; and
  means responsive to said control signal for selectively altering the pulse width of said first pulsating signal so that the pulse width of said control signal is altered to be within a prescribed interval.

2. In a time interval measurement system, apparatus for automatic time interval ranging which comprises:
  means for generating reference pulses at predetermined intervals;
  means responsive to said reference pulses for generating a first pulsating signal;
  means responsive to a test signal for generating a second pulse signal representative of a first phase position of said test signal;
  means responsive to said first pulsating signal and said second pulse signal for generating a first control signal, said first control signal having a pulse width representative of the time interval between the occurrence of a predetermined change of state of said first pulsating signal and the occurrence of said second pulse signal; and
  means responsive to said first control signal and to said reference pulses for selectively inhibiting reference pulses being supplied to said first pulsating signal generating means for altering the phase of said first pulsating signal relative to said second pulse signal so that the pulse width of said first control signal is adjusted to be within a prescribed interval.

3. The invention as defined in claim 2 wherein said inhibiting means includes means responsive to said first control signal and said reference pulses for generating a second control signal having an interval directly related to the number of reference pulses occurring during the pulse width interval of said first control signal and switching means responsive to said second control signal for inhibiting said number of reference pulses from being supplied to said first pulsating signal generating means.

4. The invention as defined in claim 3 wherein said second control signal generating means includes first gate means having first and second inputs and an output, said reference pulses being supplied to said first input, said first control signal being supplied to said second input for enabling said first gate means to pass reference pulses during the pulse width interval of said first control signal, and timing means responsive to reference pulses developed at the output of said first gate means for generating said second control signal, said second control signal being in a prescribed phase relationship with said first control signal and having an interval which encompasses a number of reference pulses occurring during said first control signal interval.

5. The invention as defined in claim 4, wherein said switching means includes second gate means having a first input, a second input and an output, said reference pulses being supplied to said first input, said second control signal being supplied to said second input and said output being in circuit relationship with said first pulsating signal generating means, said second gate means being responsive to said second control signal for selectively inhibiting the supply of reference pulses to said first pulsating signal generating means.

6. The invention as defined in claim 5 wherein said timing means includes a first monostable multivibrator for generating signals having a predetermined interval in a one-to-one relationship in response to the reference pulses developed at the output of said first gate means and a second monostable multivibrator selectively responsive to the signals generated by said first monostable multivibrator for generating signals in a one-to-one relationship with the reference pulses developed at the output of said first gate means each having an interval which encompasses an individual reference pulse.

7. The invention as defined in claim 6 wherein said first control signal generating means includes bistable switching means having a first input, a second input and an output, said first pulsating signal being supplied to said first input for switching said bistable element from a first predetermined stable state to a second predetermined stable state, said second pulse signal being supplied to said second input for switching said bistable means from said second stable state to said first stable state and said first control signal being developed at said output.

8. The invention as defined in claim 7 further including means responsive to said first pulsating signal for generating a third pulse signal representative of the instant a predetermined change of state of said first pulsating signal has occurred, and wherein said bistable switching means includes a first flip-flop circuit having a SET input, a RESET input and an output, said third pulse signal being supplied to said SET input and said second pulse signal being supplied to said RESET input, said first flip-flop circuit being responsive to said second and third pulse signals for generating said first control signal at said output.

9. The invention as defined in claim 8 further including means responsive to said test signal for generating a fourth pulse signal representative of a second predetermined phase position of said test signal, a second flip-flop circuit having a SET input, a RESET input and an output, said third pulse signal being supplied to said SET input, said fourth pulse signal being supplied to said RESET input, said second flip-flop circuit being responsive to said third and fourth pulse signals for generating a signal at said output representative of the time interval between the occurrence of said third and fourth pulse signals, and further including means responsive to signals developed at the output of said first gate means and the output of said second flip-flop circuit for yielding a measure of the time interval between the occurrence of a predetermined change of state of said reference pulsating signal and a predetermined phase position of said test signal.

10. A time interval measurement system including apparatus for automatic time interval ranging which comprises:

means for generating clock pulses at predetermined intervals;

divider means responsive to said clock pulses for generating a first pulsating signal;

means responsive to a test signal for generating a second pulse signal representative of a first predetermined phase position of said test signal, first bistable switching means supplied with said first pulsating signal and said second pulse signal for generating a first control signal representative of an interval between the occurrence of a predetermined change of state of said first pulsating signal and the occurrence of said second pulse signal;

first gate means having a first input, a second input and an output, said clock pulses being supplied to said first input, said first control signal being supplied to said second input and said first gate means being responsive to said control signal for generating clock pulses at said output during said first control signal interval;

timing means responsive to the clock pulses developed at the output of said first gate means for generating a second control signal; and second gate means responsive to said second control signal for inhibiting the supply of a number of clock pulses to said divider means equal to the number of clock pulses developed at the output of said first gate means.

11. The system as defined in claim 10 wherein said timing means includes a first monostable multivibrator responsive to the individual clock pulses developed at the output of said first gate means for generating a first timing signal having a predetermined interval and a second monostable multivibrator selectively responsive to said first timing signal for generating said second control signal, said second control signal having an interval which encompasses selected ones of said clock pulses.

12. The system as defined in claim 11 further including means responsive to said test signal for generating a third pulse signal representative of a second predetermined phase position of said test signal, second bistable switching means supplied with said first pulsating signal and said third pulse signal for generating a signal representative of the time interval between the occurrence of a predetermined change of state of said first pulsating signal and said third pulse signal and means responsive to the clock pulses developed at the output of said first gate means and the signal generated by said second bistable switching means for yielding a measure of the time interval between a predetermined change of state of said first pulsating signal and a predetermined phase position of said test signal.

* * * * *